Aug. 23, 1966 M. S. GORDON 3,267,722
PORTABLE APPARATUS FOR COMPARATIVE
TESTING OF TWO OR MORE LIQUIDS
Filed May 1, 1963 2 Sheets-Sheet 1

INVENTOR
Myron S. Gordon
BY
Birch and O'Brien
ATTORNEYS

INVENTOR
Myron S. Gordon

BY Birch and O'Brien
ATTORNEYS

# United States Patent Office 3,267,722
Patented August 23, 1966

3,267,722
PORTABLE APPARATUS FOR COMPARATIVE
TESTING OF TWO OR MORE LIQUIDS
Myron S. Gordon, Annapolis, Md., assignor to Lengor, Incorporated, Annapolis, Md., a corporation of Maryland
Filed May 1, 1963, Ser. No. 277,207
6 Claims. (Cl. 73—56)

The present invention relates generally to testing apparatus for liquids and more particularly to improvements in portable apparatus for comparative testing of two or more liquids, illustrated and described in prior patent 2,823,541, issued February 18, 1958, and owned solely by the present assignee, Lengor, Inc. of Annapolis, Maryland.

This prior patent has proven to be very useful and valuable and is the first teaching of a portable oil-testing apparatus, whereby two or more identical viscosity test cups with identical dimensioned holes in their bottom surfaces are lowered simultaneously and immersed into two or more beakers filled with oils to fill the cups with oil to be compared from their respectively associated beakers and raised from the beakers to a level above the same whereby the flow of oil from the holes in the bottom of each cup may be observed to determine the comparative viscosity of the oil in each beaker. While as above stated the apparatus of Patent 2,823,541 has been very efficient for comparative oil tests, the use of such apparatus has required the following steps:

(1) Simultaneous lowering of the oil viscosity test cups into the lower positioned oil filled beakers;

(2) Simultaneous raising of the oil viscosity test cups on suitably positioned guide means to an elevated position above the beakers; and (3) Simultaneous retention of the rasied cups in their elevated positions free of the lower beakers by suitable latch means, which latch means must be certain to retain the cups elevated above the beakers with each test operation or the test cannot be made as the test cups will drop back by gravity into the beakers.

Thus a general object of this invention is to provide novel oil testing apparatus of the foregoing type whereby manual movement of a single control results in a simultaneous relative movement of the brace of units to comparative oil test dip and flow positions.

Another object of this invention is to eliminate the need for moving the test cups and to provide novel means, whereby a brace of beakers are simultaneously guided to uniform raised positions around a brace of test cups, to thereby equally fill the brace of test cups and whereby the brace of beakers are simultaneously returned to their respective normal lower positions, after the brace of cups have thus been uniformly filled with oil to be compared.

Another object of this invention is to provide simultaneous immersion, filling and test emptying of the test cups of an oil test apparatus by a single manual lever.

Another more specific object of this invention is to provide an improved and simplified test performance for a simultaneous uniform dip and flow oil comparative apparatus, whereby all latch means for the movable parts are eliminated.

Still another object is to provide novel means for relatively moving the operating parts of the oil test apparatus to dip, fill and flow positions to consummate an oil test cycle.

Another object is to simplify and economize in construction and in materials required for the oil testing apparatus.

Other objects, advantages and uses of the present invention will appear more fully after reading the following detailed description together with reference to the accompanying drawings wherein four embodiments are shown. It is to be understood, however, that these embodiments are four examples only of the device and other arrangements and improvements which will now be apparent to others may be made without departing from the scope of the present invention.

In the drawings:

FIGURE 5 is a fourth form of the invention illustrating another hand lever and beaker or reservoir cup supporting arrangement, said cups as illustrated being disposable containers of paper or the like.

Figure 1:
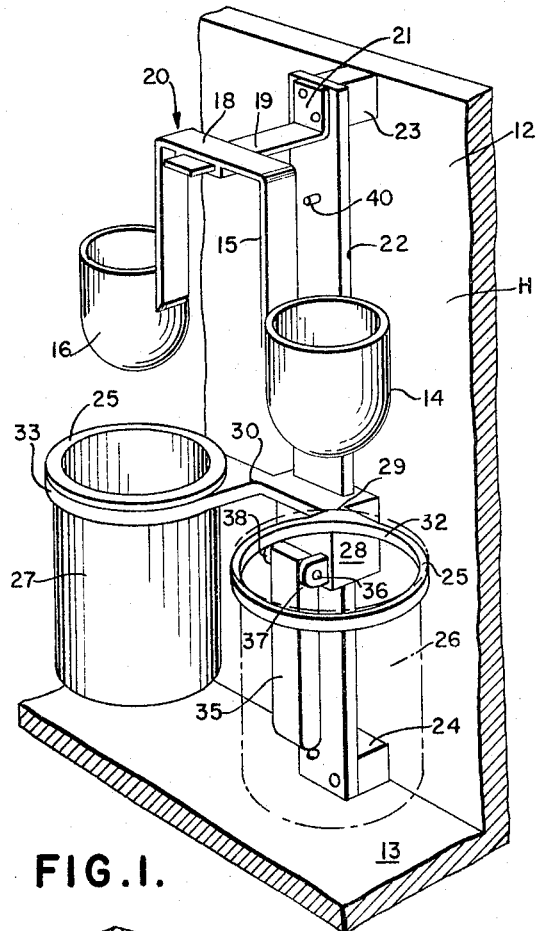
FIGURE 1 is an isometric side view of one form of the present invention showing a supporting means therefor cut-away and in cross-section.
Figure 2:
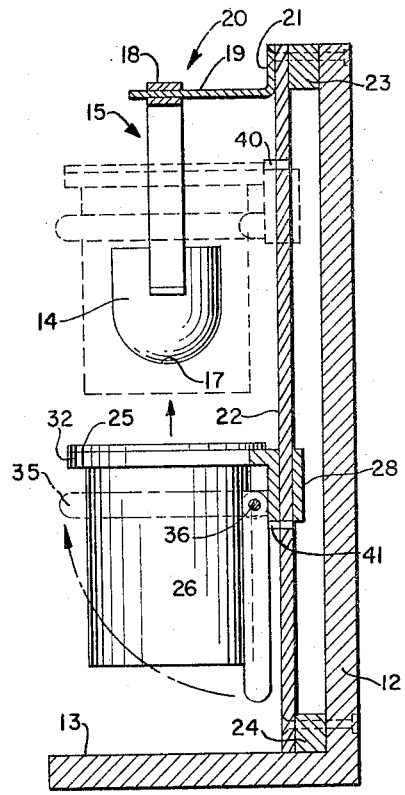
FIGURE 2 is a side view in cross-section of the supporting means shown in FIGURE 1 with the test cups and the beakers or reservoir cups in side elevation and illustrating the relative positions of the beakers or reservoir cups with respect to the test cups in dotted lines.

Referring to the drawings and first with respect to FIGURES 1 and 2, there are shown the rear wall 12 and bottom wall 13 of one half-section of a suitable carrying container or case H. This case section is for mounting and confining the oil test apparatus in respectively required juxtaposed vertically aligned positions so when the case is opened the oil test apparatus is exposed to clear view. The basic elements of the apparatus generally comprise the following:

(a) A brace of identical test cups 14 and 16 having a central opening 17 in the bottom of each identical to each other;

(b) Support means 20 for the test cups;

(c) A vertical standard 22 to which said support means attaches, said standard having spacer means 23 and 24 between the standard and the wall 12 of one half-section of the carrying case H for the test equipment;

(d) A brace of beakers or reservoir cups 26 and 27 for holding sample liquids to be comparison tested;

(e) A slidable bracket 28 having horizontally extending arms 29 and 30 with beaker or cup holding rings 32 and 33 carried by each arm extension so arranged and positioned as to align respectively each below one of the smaller test cups 14 and 16; and (f) Manual means 35 operatively associated with the slidable bracket 28 adapted to raise the slidable bracket with the brace filled beakers or cups to a concentrically oil test cup immersion position for filling, until said manual means 35 is released to permit the bracket 28 with the beakers or cups in the rings to return to their lowermost rest positions to a position of rest under the oil test cups on the bottom wall 13.

Because of the importance of each of the above basic elements each will now be described in detail under their respective headings.

*Test cups and support means*

As above set out in outline under topics (a), (b), (c), (d), (e) and (f), the oil test cups 14 and 16 are formed with centered bottom openings 17 and each cup is in every respect a facsimile of the other, so as to provide for accurate observation comparison tests of different oils when the case is opened. For example, with this arrangement on the spot oil testing may be made to aid in detection of too-rich carburetion, faulty chokes, stuck fuel injectors, leaky fuel lines, fouled spark plugs, cracked blocks, stuck thermostats, unsatisfactory fuels, low additive level lubricants, worn piston rings, and the need of an oil filter change.

Each cup 14 and 16 is supported by an inverted U-shaped brace 15 and each cup is suitably secured to the lower outer oppositely facing surfaces of the brace 15. Also, these cups may be of any desired material, such as plastic, paper, aluminum or steel depending upon the liquids to be tested and the economy in material required.

The bridge 18 of the U-shaped brace 15 is formed with a central slot arranged to receive a horizontally extending flat bracket bar 19, which is suitably secured as by a riveted vertically positioned foot portion 21 to the top front face of a vertical standard 22. This standard 22 extends vertically from the bottom wall 13 of one section of the case H and is spaced in parallel relation to the wall 12 of the case section at right angles to the bottom wall 13 by space means 23 and 24 and acts as a guide bar or track for a brace of test cup immersion beakers or liquid reservoir cups.

Beakers or reservoir cups and support means

The test cup immersion beakers or reservoir cups 26 and 27 like the test cups are made of identical shape and size and are facsimiles of each other. These beakers or reservoir cups are each formed with a beaded or flanged annular rim 25, which rim seats upon the upper area of holding rings 32 and 33, respectively. Rings 32 and 33 are secured at the ends of the horizontally extending arms 29 and 30 of the slidable bracket 28 formed with a centrally positioned vertical guide slot. The bracket 28 is rearwardly offset centrally between the holding rings 32 and 33.

The slotted bracket 28 is slidably mounted around the guide bar 22 and is adapted to be moved up and down by the hand lever 35 with the brace of test cup immersion beakers or reservoir cups toward and away from the brace of relatively smaller test cups during each operative test cycle. For example, in FIGURES 1 and 2 the hand lever 35 is mounted on a pivot pin 36 between lugs 37 and 38 extending outwardly from the bracket 28. Also, in the path of movement of the slide bracket 28 are upper and lower stop pins 40 and 41, see FIGURE 2, which extend horizontally from the front of the guide bar 22 at predetermined spaced positions to provide the proper coactive immersion relationship between the oil test cups 14 and 16 and beakers 26 and 27 at the upper travel point of the bracket 28 with the brace of beakers and to provide the proper relative coactive position relationship between the bottom 13 of the supporting half section of the portable housing H and the bottoms of the respective beakers or reservoir cups after release of the handle to permit the measured comparative flow from the brace of test cups after the gravity return of the beakers from an immersion of the oil test cups.

Thus assuming it is desired to expose damaging fuel dilution of engine oil, a fuel dilution test may be made by filling one of the beakers or reservoir cups 26 with a sample of used engine oil with the housing H open for viewing the test equipment; then by filling the other beaker or reservoir cup 27 with a sample of new oil plus a predetermined quantity of fuel, for example, any amount of dilute desired 1, 3 or 5 percent or more; then the brace of beakers or reservoir cups are raised by the handle 35 so that the brace of oil test cups 14 and 16 are simultaneously completely immersed in the contents of each respective relatively larger beaker or reservoir cup 26 and 27; then the brace of lower cups 26 and 27 are permitted to return to a rest position on the bottom 13 of the box; and in final analysis the flow of oil through the orifices 17 in the bottom of each oil test cup is observed. If the oil from the cup 16 containing the used engine oil stops first, it is excessively diluted.

Thus a test made in this manner indicates whether used oil is 5 percent, or any other amount, diluted and should be changed, or if it is under 5 percent then it is still safe to use, and need not be changed.

Figure 3:
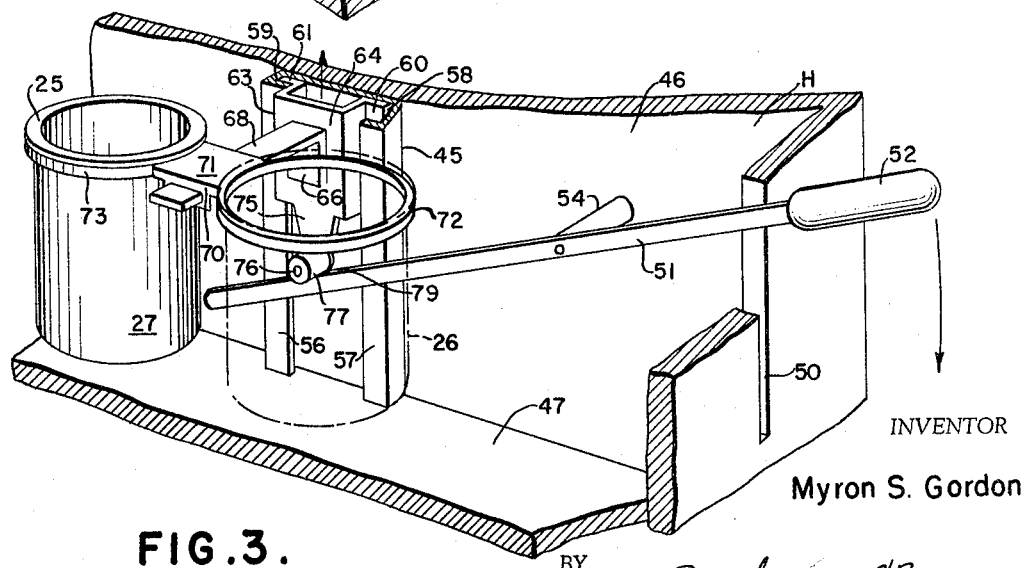
FIGURE 3 is a partial section view of a second form of the invention showing the beakers or reservoir cups and their carrier brace in position for movement upward to completely immerse the oil test cups shown in FIGURES 1 and 2.

A second embodiment of the invention is shown in FIGURE 3. This form of the invention is provided with the same U-shaped brace 15 for the oil test cups as shown in FIGURES 1 and 2 and these cups are similarly mounted on a horizontal support bar on a vertical guide means 45 secured to the case section wall 46 and extending upwardly from the bottom 47 of the case section of a case H shown cut-away in cross section. This case section is formed with an elongated slot 50 through which extends a hand lever 51 with an end handle 52.

The lever 51 is pivoted to a stud 54 extending inwardly from the wall 46 spaced away from a side of the guide means 45.

The guide means 45 is an inwardly flanged C-shaped channel bar with opposed facing flanges 56 and 57 in the provision of spaced apart guide grooves 58 and 59. The grooves are designed to receive the outwardly directed feet 60 and 61 formed from a shuttle 63, which is U-shaped in cross section to provide a support surface 64 to which the foot or vertical end 66 of a flat support bar 68 is suitably secured, as by welding or riveting. This support bar 68 extends horizontally outward from the support surface of the shuttle 63 through a slot in the enlarged section 70 of a brace member 71 formed with horizontally spaced support rings 72 and 73.

The rings 72 and 73 like those shown in FIGURES 1 and 2 are adapted to support beakers or reservoir cups, such as 26 and 27 by the flanged rims 25 thereof.

The shuttle 63 includes a reduced vertically depending tongue 75 with a horizontal pin 76 and a roller 77 rotatably mounted thereon. The roller 77 engages a portion of the elongated edge 79 of the hand lever 51 which angularly extends under the roller 77 and across the guide means 45. Thus the roller 77 is similar in action to a cam follower as it follows the swinging up or down movement of the hand lever 51, whereby the shuttle 63 is raised up or down in the guide means 45 to raised oil test cup immersing position and gravity return to comparative observation position as explained in connection with the test operation with respect to the apparatus of FIGURES 1 and 2.

Figure 4:
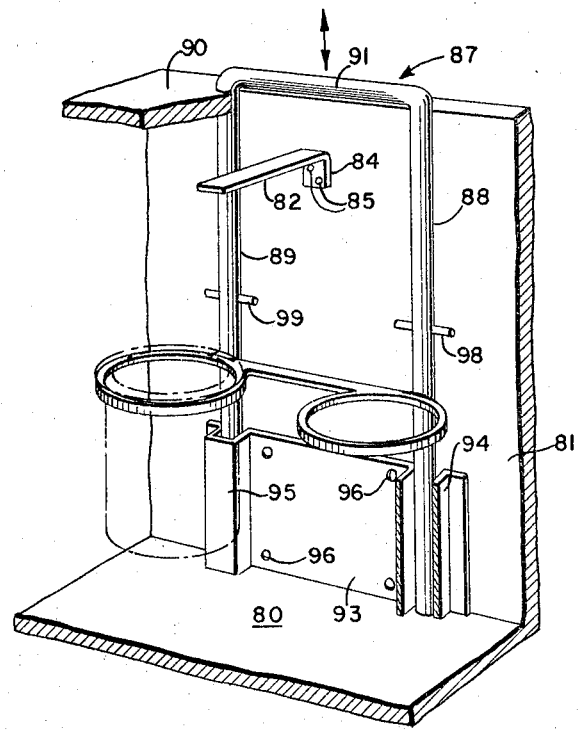
FIGURE 4 is a third form of the invention and is an isometric front view of the same partly in cross-section with the brace of oil test cups removed from the support bar therefor for clarity.

A third form of beaker or reservoir cup support and means for mobilizing the same to oil test cup immersing position for the start of a test cycle is shown in FIGURE 4. This form includes a case section with a bottom wall 80 and a back wall 81, wherein the vertical guide means of the previously described forms is changed and the elevated test oil cup support bar 82 is secured by a foot 84 directly by fasteners 85 to the upper portion of the case section wall 81.

Equally spaced and straddling the support bar 85 is a U-shaped wicket 87. The legs 88 and 89 of the wicket preferably extend from outside the top wall 90 of the equipment section of the case H at the bridge 91 thereof to the bottom 80 of the case section.

A plate 93 with end channel sections 94 and 95 at each end is secured by means, such as screws or rivets 96 to the wall 81 of the case section with the lower longitudinal edge thereof at rest on the bottom wall 80 in the corner provided by the junction of the walls 80 and 81 with each other. When thus mounted on the case section wall 81, the channel sections serve as guide means for the lower ends of the wicket legs 88 and 89. Also, when the wicket 87 is in its lowered position in the case section with the leg ends thereof resting on the section bottom 80, the bridge 91 of the wicket is substantially flush against the exterior of the top wall 90 of the case section.

Each wicket leg 88 and 89 includes a stop means, such as a transverse pin 98 and 99. These stop pins are so proportioned and spaced on the respective wicket legs as to provide for the raising and lowering of a brace of beakers or reservoir cups to a predetermined level to encompass and immerse a brace of relatively smaller oil test cups, not shown, but supported as in FIGURES 1 and 2 on the rear wall support bar 82.

The actual operation of this embodiment involves the grasping of the handle portion or bridge 91 of the wicket 87 by which the same is elevated until the stop means 98 and 99 engage the under surface of the top wall 90 of the casing section. When this occurs the beakers or reservoir cups completely enshroud the test oil cups on the bracket 82 and become filled with oil by immersion in the beakers or reservoir cups, after which the handle 91 may be released to permit return by gravity of the beakers to a rest position on the bottom surface 80 of the casing section.

The test cycle proceeds as set forth above in connection with the operation of the embodiment of FIGURES 1 and 2, that is, the oil in the oil test cups flows into the beakers under observation of the test operator, until one of the test cups becomes empty with respect to the other. The oil test cups may be transparent to aid in the observation test.

Figure 5:
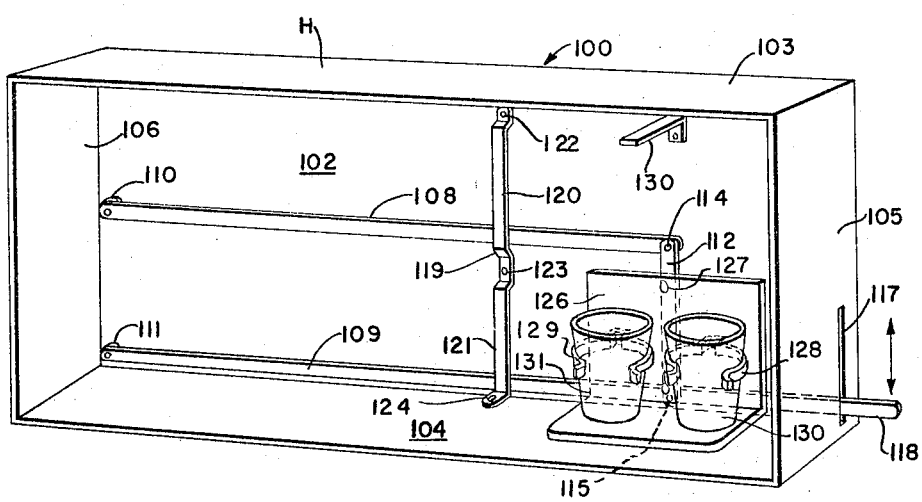

A fourth embodiment of the invention is illustrated in FIGURE 5, wherein one half-section 100 of the case H is shown with the front open for observation, a rear vertical support wall 102, top and bottom walls 103 and 104 and end walls 105 and 106.

This embodiment includes a parallelogram form of linkage with vertically spaced normally parallel levers 108 and 109 pivoted on spaced vertical studs 110 and 111 mounted on the rear vertical wall 102 of section 100 and which levers are joined pivotally together by vertical link 112 by pivot pins 114 and 115.

The lever 109 is made longer than lever 108 so as to extend outwardly through a slot 117 in end wall 105 of the case section 100. The extension 118 of the lever 109 serves as a handle to operate the parallelogram levers.

The levers 108 and 109 are guided in vertically aligned bowed-sections 120 and 121 formed in a vertical guide bar 119 secured by means, such as rivets 122, 123 and 124 to the rear and bottom walls 102 and 104 of the case section 100.

Secured to the link 112 is an angle bracket 126 with securing rivets 127. This bracket supports and carries beaker or reservoir cup spring cup clips 128 and 129 to receive the beakers or reservoir cups 131 and 132, which in this instance may be disposable paper cups. Also, mounted on the rear wall 102 above the brace of support rings in a predetermined proper location is a support bar 130 for oil test cups, each as 14 and 16 shown in FIGURE 1.

Operation of this embodiment is accomplished by raising the lever extension 118 in the slot 117, which imparts movement to the angle bracket 126 to raise the same with beakers or reservoir cups to enshroud oil test cups supported on bar 130. Upon complete simultaneous immersion in the oil in the cups carried by the clips 128 and 129, the test cups will become filled and the extension 118 is then released to permit the return of the bracket 126 and the cups to complete a test observation cycle as the oil in the spaced test cups flows respectively therefrom into their respective lower positioned reservoir cups.

Thus there are provided novel simple oil testing arrangements to provide great economy in motor vehicle operation. For example, with the use of the present novel oil testers oil and filter changes are reduced, since this test equipment takes the guesswork out of costly maintenance; engine efficiency is boosted because this test apparatus reveals the early presence of excessive abrasive solid in engine oil and prevents engine damage, provides smooth operation, results in lower repair costs, reduces "down" time and extends engine life.

Without further description it is believed that the advantages of the present invention over the prior art is apparent and while only four embodiments of the same are illustrated, it is to be expressly understood that the invention is not limited thereto as various changes may be made in the combination and arrangement of the parts illustrated, as will now likely appear to others and those skilled in the art. For a definition of the scope or limits of the invention, reference should be had to the appended claims.

What is claimed is:

1. Apparatus for comparative test of oil and the like comprising a suitable sectional casing, a brace of identical test cups having a central opening in the bottom of each identical to each other, elevated support means for the test cups, a vertical standard to the upper end of which said support means attaches, a brace of reservoir cups relatively larger than said test cups for holding sample liquids to be comparison tested with said test cups, said standard having vertically spaced spacer means between the standard and the wall of the suitable sectional casing providing a space between the standard and the said casing wall, a bracket slidable on said standard between the said spacer means, said bracket having horizontally extending arms with cup holding rings carried by each arm, said arms being so arranged and positioned as to align respectively each reservoir cup below one of the said relatively smaller test cups, and a handle pivoted between lug means secured to said slidable bracket, said handle being movable from an inoperative to an operative position between said spacer means to thereby raise the slidable bracket with the brace of reservoir cups filled with oil to be comparison tested to a concentrically oil test cup immersion position for equally filling the said test cups, until said handle is released to permit the slidable bracket with the reservoir cups in the said rings to return to their lowermost rest positions under the oil test cups.

2. Means for comparative tests of oil comprising a brace of oil test cups and a brace of oil filled beakers, an elevated support for retaining said oil test cups in an elevated position, a movable bracket formed with beaker holding means, guide means for said bracket, said guide means serving to position each of said beakers in alignment with one of the oil test cups on said elevated support, and manual means operatively associated with said movable bracket for simultaneously raising the same with the said beakers to simultaneously immerse the oil cups in the oil in said beakers to initiate an oil test, said bracket connecting a shuttle connected to said bracket and said guide means, and a track for said shuttle, said shuttle having a depending follower roller, said roller being engaged by said manual means to thereby move said bracket.

3. In a portable oil testing assembly, a brace of oil test cups and a brace of larger oil reservoir cups, said oil test cups being supported at a level above said larger reservoir cups, said oil test cups being facsimiles of each other and said reservoir cups being facsimiles of each other, said oil test cups being supported by a fixed bracket and said larger reservoir cups being vertically movable simultaneously so as to immerse said oil test cups in said larger reservoir cups, said reservoir cups being mounted in a bracket, a wicket having legs across which said bracket is secured, guide means for said wicket legs, stop means on each leg and a handle at the top of the wicket for raising said bracket with said reservoir cups to immerse said test cups in the oil in said larger reservoir cups to initiate a comparative oil test cycle.

4. In a portable oil testing assembly, a brace of oil test cups, and a brace of larger oil reservoir cups, said oil test cups being supported at a level above said larger reservoir cups, said oil test cups being facsimiles of each other and said reservoir cups being facsimiles of each other, said oil test cups being supported by a fixed bracket and said larger reservoir cups being vertically movable simultaneously so as to imerse said oil test cups in said larger reservoir cups, said reservoir cups being mounted in a bracket, said bracket being secured to a vertical link, said link being connected in a parallelogram linkage assembly, said linkage having an extended lever portion, said linkage being movable by upward movement of said lever, whereby said bracket and said larger reservoir cups supported therein are raised to immerse said oil test cups and fill the same, and guide means for each lever of said linkage to maintain alignment positions between said respective larger reservoir cups and said oil test cups during the raising and lowering of said larger reservoir cups.

5. A portable oil test assembly comprising a sectional casing, a brace of identical test cups having identical bottom openings therein, support means for holding said cups in an elevated position, a transverse plate below said support means, said plate being formed with a horizontally spaced channel at each end, a brace of reservoir cups supported between said support means and said plate, and said cups being secured in horizontally spaced alignment to the spaced apart legs of a wicket, each of said legs at their lower ends being confined and movable in one of said spaced channels, whereby said reservoir cups are each vertically aligned with one of said test cups, said reservoir cups being movable to enclose said test cups by raising the legs of said wicket in said channels when the wicket is pulled upward in the casing.

6. An oil viscosity comparator tester kit comprising a sectional housing having rear, side and top and bottom walls, a parallelogram form of linkage mounted in one section of sail housing, said linkage including vertically spaced normally parallel levers pivoted to the rear wall of the housing section at their respective vertically spaced ends, a vertical link pivotally connected between said levers, a bracket mounted on said vertical link, said link serving as a carrier link for said bracket, spring cup retainer means secured to said bracket, and oil reservoir cups in said retainer means, a support in vertical spaced position above said oil reservoir cup bracket, said support normally holding a brace of horizontally spaced viscosity comparator test cups respectively, each above one of said reservoir cups, and means to first move said bracket and said oil reservoir cups vertically to each respectively enshroud one of the said test cups to fill the same and to subsequently return said oil reservoir cups and the bracket to a position of rest below said test cups.

References Cited by the Examiner
UNITED STATES PATENTS

| | | | |
|---|---|---|---|
| 788,251 | 4/1905 | Courtois | 73—56 |
| 1,675,802 | 4/1928 | Hamilton | 73—45.5 |
| 1,712,874 | 5/1929 | Cross | 73—45.8 |
| 2,823,541 | 2/1958 | Gordon et al. | 73—56 |
| 2,836,975 | 6/1958 | Euverard | 73—55 |

DAVID SCHONBERG, *Primary Examiner.*